UNITED STATES PATENT OFFICE.

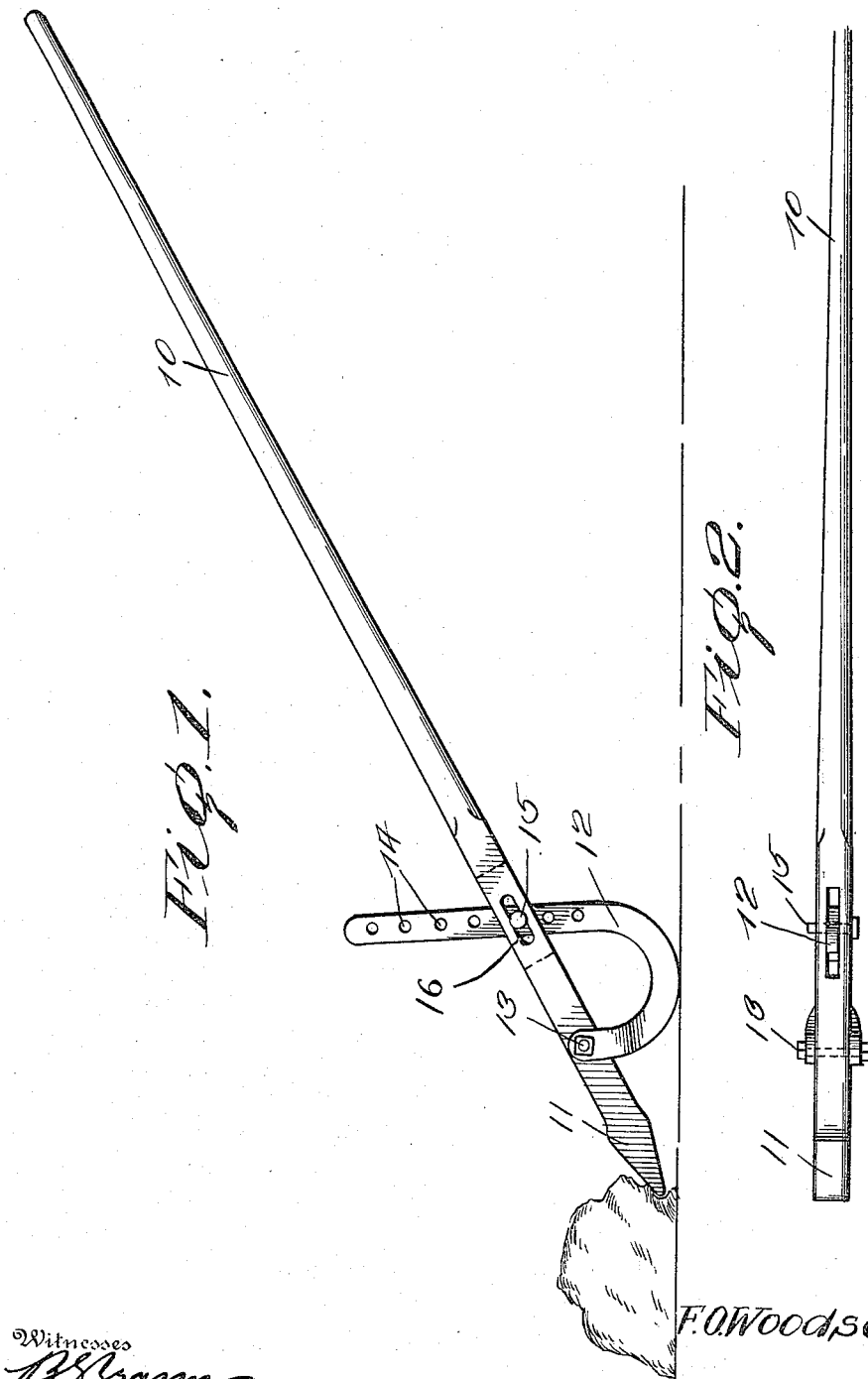

FRANK O. WOODSON, OF TUOLUMNE, CALIFORNIA.

CROWBAR.

1,164,155.  Specification of Letters Patent.  Patented Dec. 14, 1915.

Application filed May 25, 1914, Serial No. 840,856. Renewed May 12, 1915. Serial No. 27,692.

*To all whom it may concern:*

Be it known that I, FRANK O. WOODSON, a citizen of the United States, residing at Tuolumne, in the county of Tuolumne, State of California, have invented certain new and useful Improvements in Crowbars; and I do hereby declare the following to be a full, clear, and exact description of the invention, such as will enable others skilled in the art to which it appertains to make and use the same.

This invention relates to improvements in crow bars.

The principal object of the invention is to provide a crow bar, the fulcrum of which can be adjusted for various classes of work and conditions.

Other objects and advantages will be apparent from the following description, when taken in connection with the accompanying drawings.

In the drawings: Figure 1 is a side elevation of a crow bar made in accordance with my invention. Fig. 2 is a top plan view.

Referring particularly to the accompanying drawings, 10 represents the handle shank of the crow bar which is provided with a foot 11 on one end, as the manner of the ordinary crow bar. An approximately J-shaped fulcrum member 12 has the end of its shorter arm pivotally connected to the shank of the bar adjacent the foot thereof, as indicated at 13. The longer arm of the fulcrum member has a longitudinal series of spaced openings 14 which are adapted to successively register with a transverse opening 16 through the shank of the bar at a suitable point above the pivotal connection 13. A removable bolt 15 is disposed through one of the openings 14 and through the shank of the crow bar to hold the longer leg in proper position.

By placing the curved lower portion of the member 12 on the ground or floor, and the foot 11 under one edge of an object to be raised, downward pressure can be exerted on the upper end of the shank to lift the foot and raise the object. This movement causes the bar to rock on the curved portion of the member 12 as the fulcrum thereof. The height to which the object is to be raised, or the leverage it is desired to get with the bar can be readily regulated by adjusting the longer leg of the member 12 with respect to the shank of the crow bar.

This device can be readily attached to the ordinary crow bar by drilling two holes transversely through the lower portion of the bar above the foot to receive the bolts which pivotally carry the shorter and longer arms of the fulcrum member. It will be understood that when adjusting the fulcrum member, the shorter leg remains pivoted to the bar, the fulcrum member being swung on this pivot when adjusting the same.

What is claimed is:

1. The combination with a crow bar, of a fulcrum member consisting of an approximately J-shaped member having the end of the shorter arm pivotally connected to the bar and the longer arm adjustably connected thereto.

2. The combination with a crow bar, of a fulcrum member consisting of an approximately J-shaped member having the shorter arm pivotally connected at one end to the bar, the longer arm of the fulcrum member having a longitudinal series of openings, the bar having an opening for registry successively with the openings of the longer arm, and a clamping bolt for passage through the registered openings.

In testimony whereof, I affix my signature, in the presence of two witnesses.

FRANK O. WOODSON.

Witnesses:
B. PACHOLKE,
J. D. GARRETT.

Copies of this patent may be obtained for five cents each, by addressing the "Commissioner of Patents, Washington, D. C."